March 18, 1930.  C. H. TAYLOR  1,750,788
VEHICLE BRAKE
Original Filed May 19, 1924   6 Sheets-Sheet 1
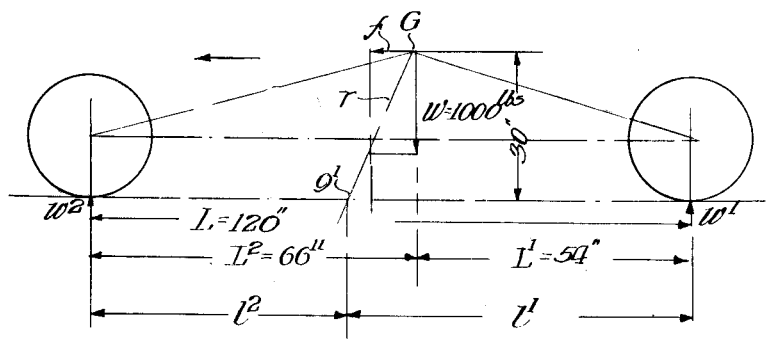
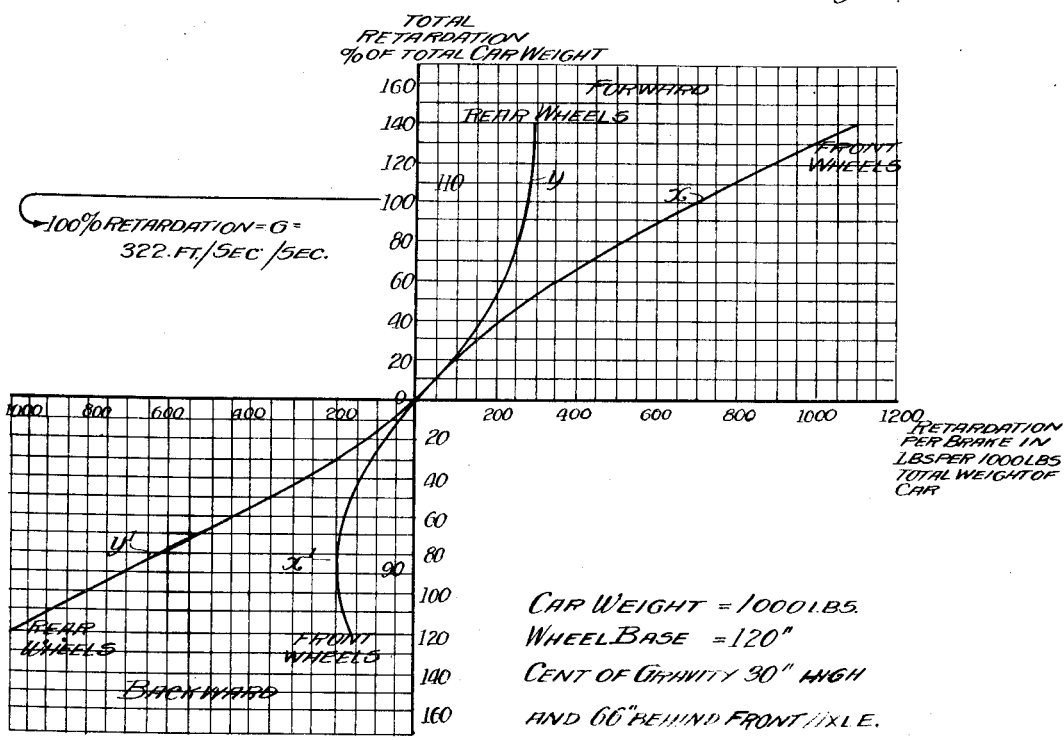

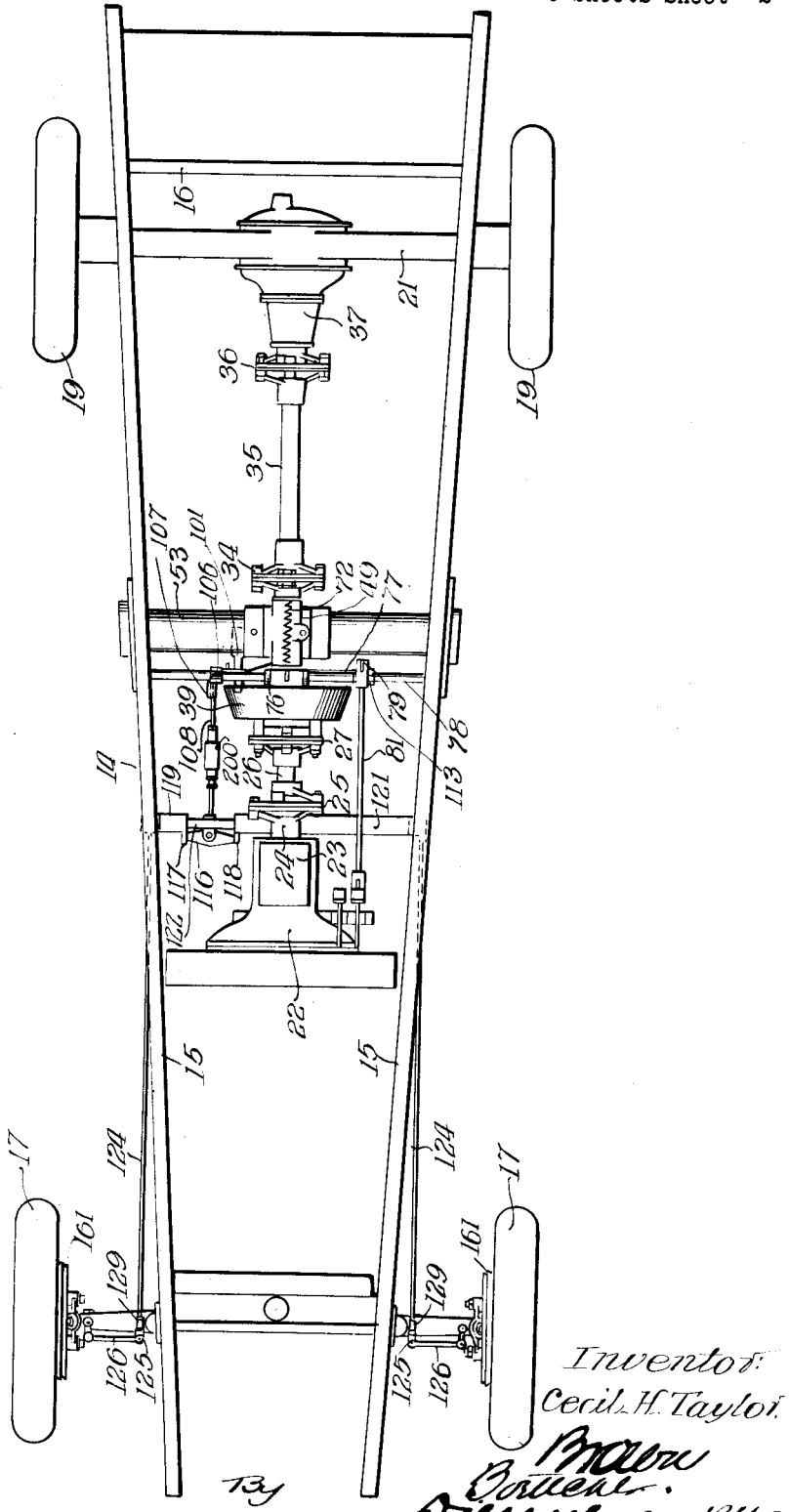

March 18, 1930.  C. H. TAYLOR  1,750,788
VEHICLE BRAKE
Original Filed May 19, 1924   6 Sheets-Sheet 3
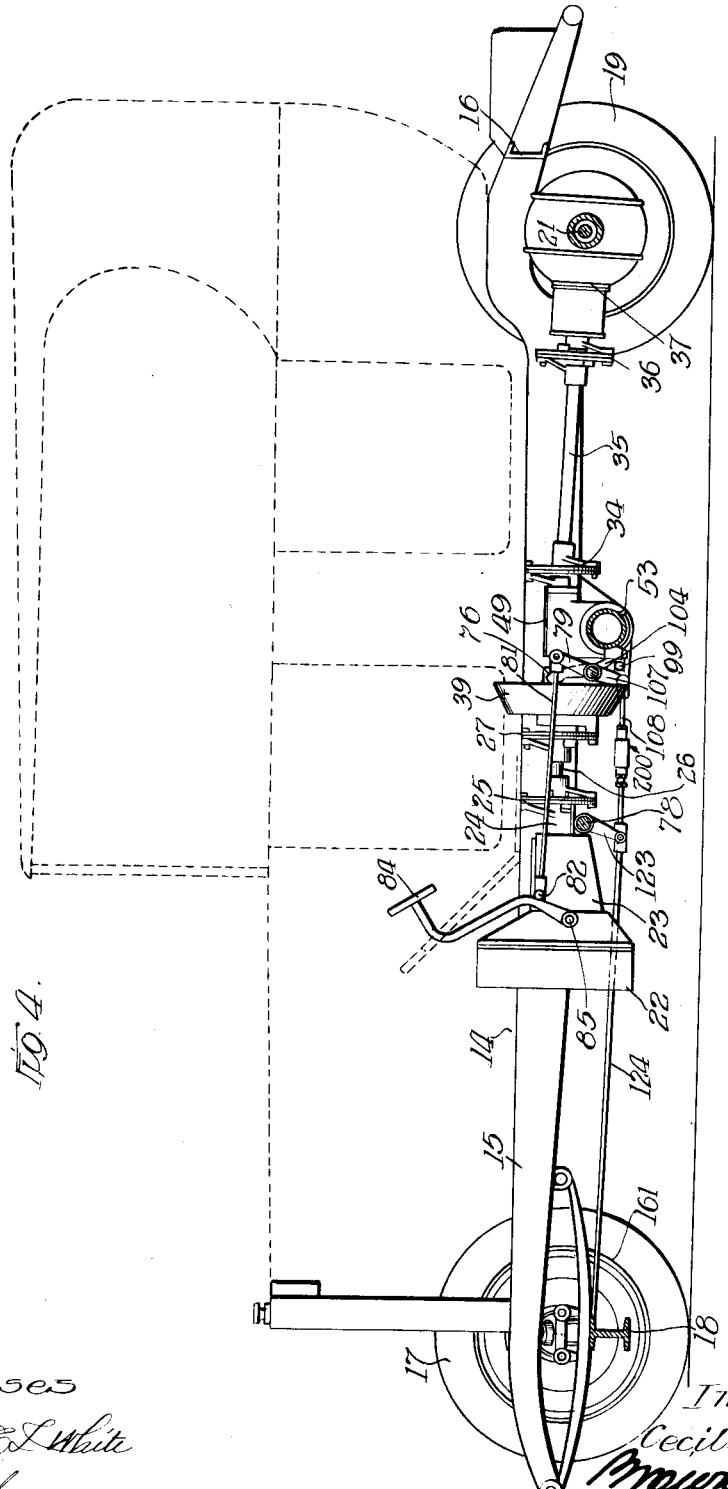

March 18, 1930.   C. H. TAYLOR   1,750,788
VEHICLE BRAKE
Original Filed May 19, 1924   6 Sheets-Sheet 4
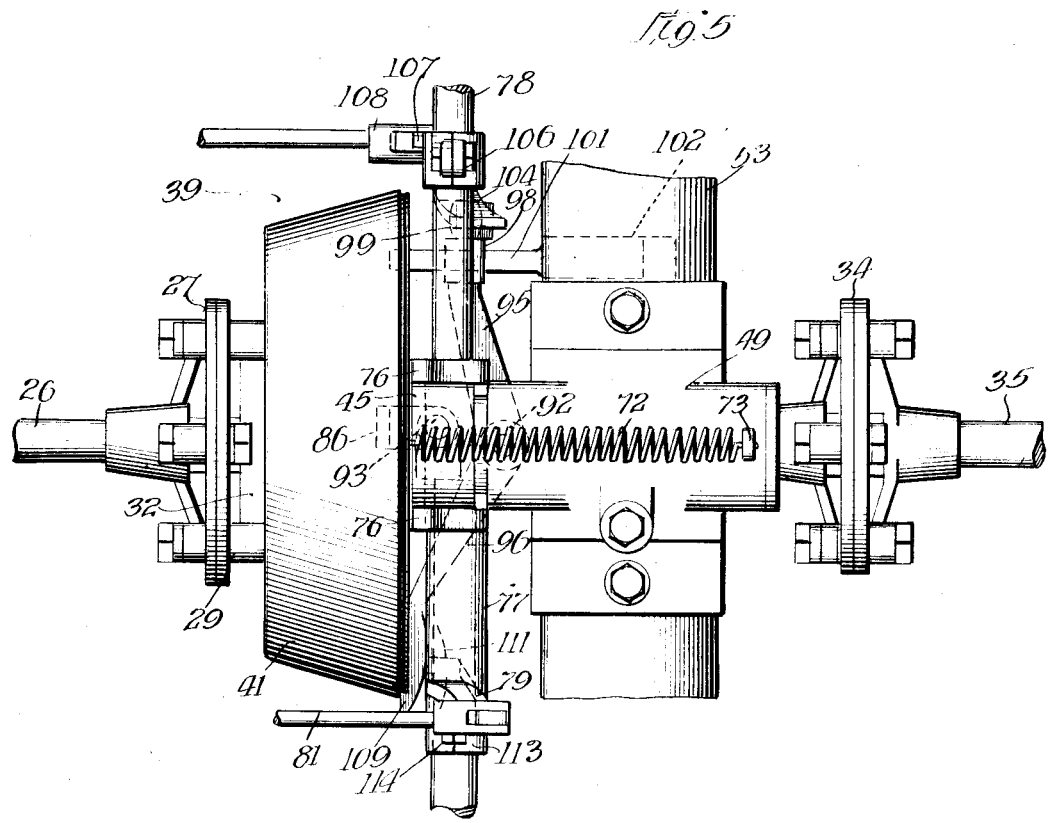
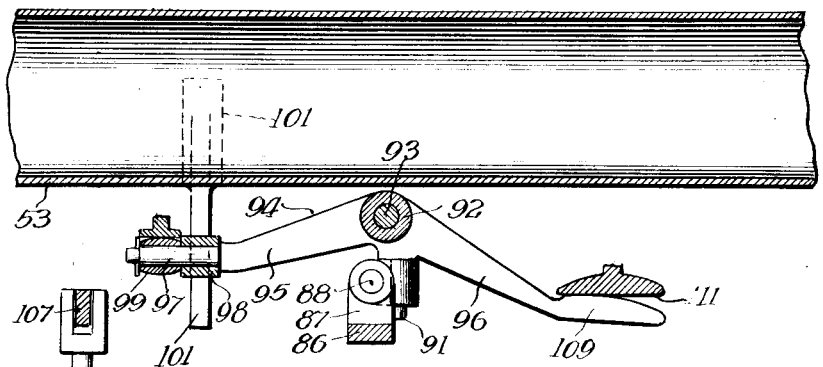

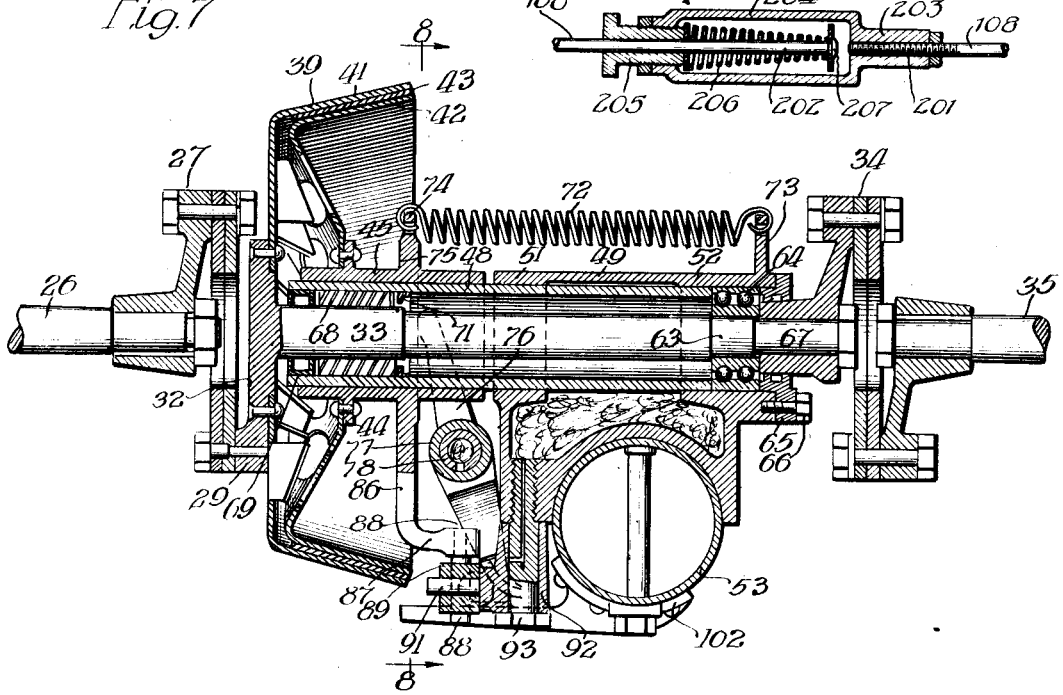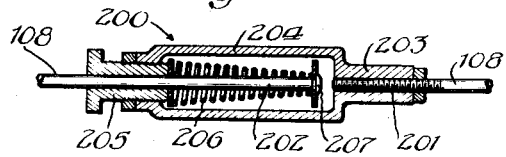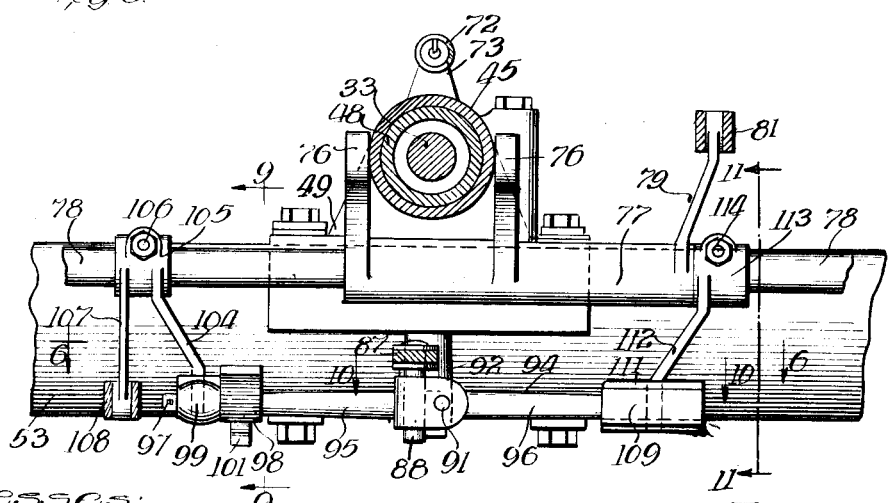

March 18, 1930.　　　C. H. TAYLOR　　　1,750,788
VEHICLE BRAKE
Original Filed May 19, 1924　　6 Sheets-Sheet 6
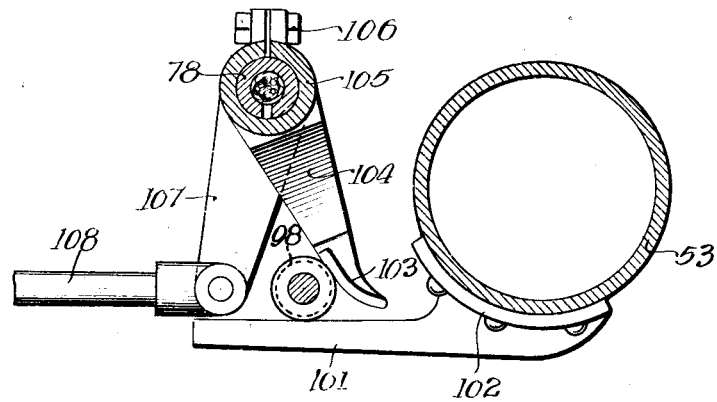
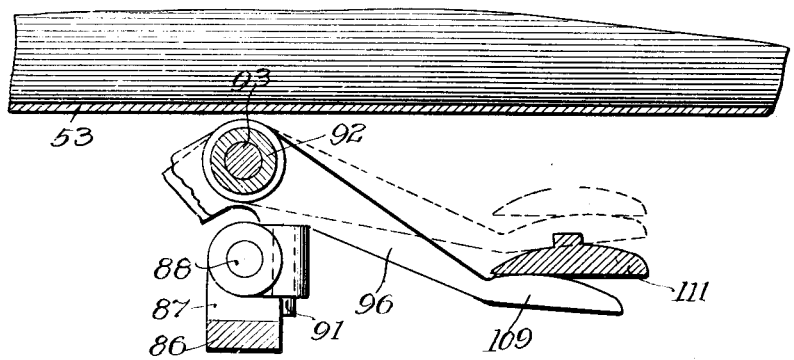
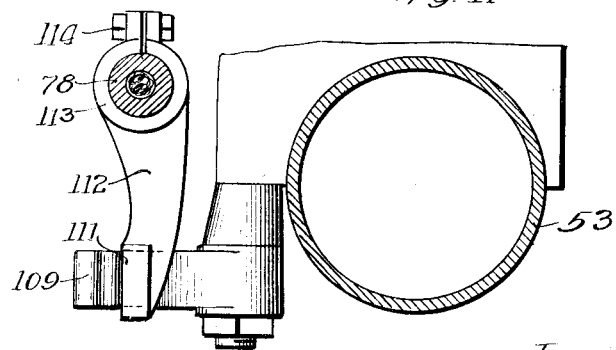
Inventor:
Cecil H. Taylor.

Patented Mar. 18, 1930

1,750,788

UNITED STATES PATENT OFFICE

CECIL HAMELIN TAYLOR, OF DETROIT, MICHIGAN, ASSIGNOR TO BENDIX BRAKE COMPANY, OF SOUTH BEND, INDIANA, A CORPORATION OF ILLINOIS

VEHICLE BRAKE

Application filed May 19, 1924, Serial No. 714,187. Renewed June 14, 1929.

The present invention relates to vehicle brakes, and is an improvement upon the invention disclosed in my co-pending application, Serial No. 690,367, filed February 4, 1924.

The invention pertains to braking systems adapted to brake both the front and rear wheels of motor driven vehicles, and has as its fundamental object to provide a braking system which will automatically apportion or distribute the braking retardation between the front and rear wheels in such manner that the wheels which can oppose the greatest braking retardation to the motion of the vehicle will receive the greatest braking effort. The desirability of such automatic apportionment or distribution of the braking retardation results from a variation in the traction pressure of the front and rear wheels and from other factors which will more clearly appear from the appended description. Suffice it to say here that when the car is rolling forward and the brakes are applied, the natural inertia of the center of gravity of the car throws an increased and probably preponderating portion of the car weight on the front wheels, whereby the front wheels are pressed down on the road with a greater tractive pressure. At such time, my improved braking system automatically applies an increased and even preponderating braking effort to the front wheels, because these wheels can carry a greater braking retardation without slipping or skidding, owing to this greater tractive pressure imposed on the wheels. My improved braking system has also the desirable action of making the braking effort applied to the front wheels a function of the braking effort which is being simultaneously applied to the rear wheels. This avoids any possibility of the car tipping forwardly under the action of this front wheel brake, even on a steep hill, as I shall hereinafter describe.

When rolling backward, the application of a braking retardation to the car results in the inertia of the center of gravity throwing a greater weight upon the rear wheels, so that these wheels then have a tractive pressure considerably above the tractive pressure effective at the front wheels. At such time, my improved braking system automatically applies the greatest braking effort to the rear wheel brake mechanism, as these rear wheels can then carry a heavier braking retardation without sliding or skidding.

A further object of the invention is to provide an improved construction of front wheel brake, and front axle construction.

Other objects will appear from the following description taken in connection with the accompanying drawings, in which:

Fig. 1 is a force diagram for illustrating forces which come into play in the typical motor car in a braking operation;

Fig. 2 is chart diagram illustrating by curves the relative braking retardations for the front and rear wheels and for forward and backward motion in a typical installation of my improved braking system;

Fig. 3 is a plan view of a typical automobile chassis to show the location of my improved braking mechanism in the driving train;

Fig. 4 is a longitudinal sectional view through the chassis;

Fig. 5 is a fragmentary plan view on a larger scale of the propeller shaft brake, and the associated mechanism which transmits the braking pressure to the front wheel brakes;

Fig. 6 is a horizontal sectional view through the variable ratio leverage mechanism, being taken approximately on the plane of the line 6—6 of Fig. 8;

Fig. 7 is a longitudinal sectional view through the propeller shaft brake mechanism, taken on a vertical plane;

Fig. 8 is a transverse sectional view taken approximately on the plane of the line 8—8 of Fig. 7;

Fig. 9 is an enlarged detail section taken on the plane of the line 9—9 of Fig. 8;

Fig. 10 is a horizontal sectional view taken approximately on the plane of the line 10—10 of Fig. 8;

Fig. 11 is a sectional view taken on the line 11—11 of Fig. 8; and

Fig. 12 is a longitudinal sectional view of the yielding connection in the braking system.

The vehicle chassis, designated 14 in its entirety, comprises two side channels 15 connected by transverse cross members 16 (Figs. 3 and 4). The front wheels 17 have particular mountings on a front axle 18, which I shall hereinafter describe, and the rear wheels 19 have conventional mounting for a drive from the rear axle 21. For brevity of illustration, the power plant has been represented only by the fly-wheel housing 22 and the transmission housing 23. A stub shaft 24 extends from the rear of the transmission housing 23 and has connection through a universal joint 25 with a shaft 26 which floats between this universal joint 25 and a second universal joint 27 at the end of the shaft. These two universal joints are of any typical form, those illustrated being of a fabric type and being described in greater detail by above mentioned copending application.

The rear spider of the second universal joint 27 comprises a flange 32, from the central portion of which extends a shaft 33 in substantial alignment with the shaft 26. This shaft has suitable bearing support at its ends, as I shall presently describe, and its rear end connects with the spider of another universal joint 34, which couples the shaft 33 to the propeller shaft 35. Another universal joint 36 may be interposed between the lower end of the propeller shaft 35 and the shaft entering the differential housing 37. The three shafts 26, 33 and 35 may all be considered different sections of one common propeller shaft upon which my improved propeller shaft brake and brake system are mounted, the universal joints 27 and 34 being merely interposed in this propeller shaft for facility of installation and avoiding the necessity of extremely accurate alignment.

The propeller shaft brake unit, which is designated 39, has been described at length in my above mentioned co-pending application, and I shall, therefore, describe only so much of its construction as is necessary to an understanding of its cooperation in the present invention. It will be observed, from Figs. 5 and 7, that this brake is generally similar in construction to a cone clutch. The outer female element 41 of the brake consists of a shell having a conical flange, the inner surface of which constitutes the braking surface. The inner, relatively stationary male element 42 has a similar conical flange, the outer surface of which constitutes the braking surface. Either or both of these braking surfaces may be faced with a suitable friction brake lining 43, in the exemplary arrangement shown, the male element having this brake lining. Both brake elements are preferably pressed out of sheet metal, the female brake element 41 being riveted to the flange 32 of the spider 29, and the male element 42 having its web rivited to a flange 44 on a rotatable sleeve 45.

The brake sleeve 45 is rotatably supported upon the forward end of a bearing sleeve 48, which projects forwardly of the bearing housing 49, concentrically of the shaft 33. As viewed from the end in Fig. 8, this bearing housing 49 is of triangular cross section, having a front hub portion 51 and a rear hub portion 52 which form two spaced points of support for the bearing sleeve 48. The bearing sleeve is rigidly secured in the hub portions 51 and 52. The bearing frame or housing 49 is rigidly mounted upon a transverse, tubular strut or cross beam 53, secured at its ends to the longitudinal channels 15—15 of the chassis frame.

In providing bearing support for the shaft section 33, the rear end of the shaft is reduced as indicated at 63 for receiving a ball bearing 64 supported in the hub portion 52 between the end of the sleeve 48 and an end closure cap 65. The cap 65 is secured to the hub portion by cap screws 66, and forms an end closure for retaining lubricant in the bearing housing, as well as acting as an abutment shoulder for the bearing 64. The reduced end 67 of the shaft is suitably keyed to the adjacent spider of the universal joint 34. For the other end of the shaft 33, a suitable roller bearing 68 is inserted between the bearing sleeve 48 and the enlarged portion of the shaft 33. Suitable lubricant retaining rings 69 and 71 are arranged at the front and rear ends of the roller bearing 68. It will be evident from the foregoing that this end of the bearing sleeve 48 provides a bearing surface for the shaft 33 and bearing 68 on its inner wall, and a concentric bearing surface for the brake sleeve 45 on its outer surface, thus insuring that the two brake elements 41 and 42 will always be retained in alignment.

The male element 42 is normally held in retracted position out of braking contact with the female brake element 41 by a tension spring 72. The rear end of this spring is hooked through an aperture in the upper end of an arm 73, rising vertically from the rear end of the bearing housing 49, and the front end of the spring is hooked through an apertured lug 74 projecting upwardly from a collar 75 formed integrally with the brake sleeve 45. When the propeller shaft brake is to be applied, the sleeve 45 is thrust endwise on the bearing sleeve 48 to force the conical brake element 42 into the rotating brake element 41, this endwise motion of the sleeve 45 being performed through the instrumentality of two arms 76, which are adapted to bear at their upper ends on diametrically opposite points of the collar 75. As shown in Fig. 8, these shifter arms 76 are formed integral with a sleeve 77 journaled upon another sleeve or tube 78. The shifter arms 76 closely embrace the sides of the sleeve 45 and confine the sleeve 77 against lateral shifting along the sleeve 78. An operating arm 79 extends upwardly from the projecting end of the sleeve 77 and has pivotal connection with an operating rod 81 (Figs. 3, 4 and 5). This operating rod extends forwardly for pivotal connection at 82 with the brake pedal 84 pivoted at any suitable point 85 on the chassis or power plant of the car. Upon depressing the brake pedal 84, it will be apparent that the sleeve 45 and male clutch element 42 will be thrust forwardly under the action of the shifter arms 76, to bring the clutch element 42 into braking contact with the rotating clutch element 41.

It will be apparent that when the braking member 42 is engaged with the rotating brake surface 41 for braking the rear wheels, a reactionary effort will be set up in the brake element 42, tending to rotate the brake element 42 with the rotating brake surface. The reactionary effort opposing this rotation of the brake member 42 will be substantially proportional to the braking pressure exerted between the brake member and brake surface, i. e., when a relatively light braking pressure is exerted between the elements 41 and 42 only a slight reactionary effort will oppose rotation of the brake member 42, but when a considerable braking pressure is applied between the elements 41 and 42, a large reactionary force is set up in any element opposing rotation of the brake member 42.

I utilize this reactionary effort of braking the rear wheels to apply the braking effort transmitted to the front wheels. To this end, an arm 86 is extended from the collar 75 and is formed with a horizontally bent end 87, through which passes a vertical pivot pin 88. As shown in Figs. 7, 8 and 10, this pivot pin extends down through a pivot block 89 in which the pin has free, sliding motion. This pivot block is also pivotally mounted upon a horizontal pivot pin 91, which projects forwardly from a rotatable hub 92, the pivot block 89 having free, sliding motion on this pivot pin 91 as well. The first pivot pin 88, the pivot block 89 and the second pivot pin 91 constitute a simplified form of universal joint for translating the rotative effort of the brake member 42 into rotative effort applied on the hub 92. This hub 92 is journaled upon a vertically extending headed stud 93, which screws up into the bottom of the bearing housing 49.

Referring to Figs. 6 and 8, the hub 92 forms the center of a yoke 94 consisting of two arms 95 and 96 extending diagonally from the hub 92. For convenience of reference, the arm 95 may be considered the "forward motion braking arm", and the arm 96 the "rearward or backward motion braking arm". The forward motion arm 95 has a cylindrical end 97 which serves as a bearing for a guide roller 98 and a pressure roller 99. The guide roller 98 is adapted to track along the top of a guide bar 101 extending from an arcuate plate 102 which is riveted to the under side of the tubular strut or cross beam 53. The pressure roller 99 is adapted to bear against a pressure foot 103 on the lower end of the lever 104. As shown in Fig. 8, this lever 104 extends downwardly from a split hub 105, which is rigidly clamped to the sleeve 78 by the bolt 106. It will be recalled that the sleeve 78 is the sleeve upon which the brake actuating sleeve 77 is pivoted.

An operating arm or lever 107 also extends downwardly from this split hub 105 (Fig. 8) for pivotal connection at its lower end with an operating rod 108, which I shall presently describe.

The backward motion braking arm 96 has a curved presser foot 109 which is adapted to bear against a broad pad plate or face 111 on the lower end of a lever 112. As shown in Fig. 11, this lever 112 extends downwardly from another split hub 113 which is rigidly clamped to the sleeve 78 by a suitable bolt 114.

Referring to Fig. 9, it will be seen that as the roller 99 moves to the right along the guide bar 101 and presses the lever 104 in this direction, the roller will continuously shift its point of contact out along the foot 103, thereby producing a definite, predetermined variation of leverage. The curvature of the foot 103 is another factor which can be designed to make this change of leverage a predetermined variable of any desired characteristic.

Referring now to Fig. 10, it will also be seen that as the presser foot 109 presses the plate end 111 backwardly, the foot 109 will continuously shift its point of contact with the plate out along the foot toward the toe end thereof. The shifting of this point of contact is illustrated by the dotted line position. It will thus be seen that there is a predetermined variation of leverage between the lever 96 and the plate end of the lever 112. The curvature or shape of the foot 109 is an additional factor which may be designed to produce any desired rate of variation and extent of variation in this change of leverage. I shall describe at length in the appended description of the operation of the system the advantageous results secured by these variations in leverage.

Since the leverage of the applied braking force varies with the position of the arms 95 and 96 with respect to their engaged arms 104 and 111, respectively, the braking system beyond the sleeve 78 (which is the common connection between arms 104 and 111) should embody a yielding connection which would permit the arms 104 and 111 to move to such positions as would secure the desired leverage and consequently give a desired braking force graduated and proportional to the pressure exerted upon the brake pedal by the foot of the operator. This will be readily understood when it is considered that the application of the rear brakes is a function of pressure between the braking elements on the transmission brake; but the application of the front brakes is a function of the leverage, and the leverage, in turn, is a function of position. The natural spring in the braking system may be sufficient to permit this change of position with change of the applied braking force, but it is not readily controllable. I therefore prefer to imply a yielding connection 200 in the brake rod 108, as will be apparent from Figs. 4, 5 and 12. This yielding connection has the function of a spring scale, in that it will permit of a given displacement of the spring for a given applied force.

The construction of this yielding element will be apparent from Fig. 12. The rod 108 is divided into two parts 201 and 202, the end 201 being threaded in a sleeve or collar 203, which forms an integral part of a shell or housing 204, the other end of which shell or housing is closed by an adjustable screw plug 205 for controlling the tension in compression of the spring 206. The end 202 of the rod 108 passes through said plug 205 and is provided with a head 207, between which head and the plug 205 the spring 206 is confined.

The spring 206 is preferably made of flat sided coils, so that the spring may be collapsed upon itself without injury. It may also be made of any preferred shape to give the desired characteristic relation between applied pressure and displacement. For example, its shape may be cylindrical, conical or the like, to secure the desired action. The initial tension is controlled by the plug 205 which is threaded into the end of the housing 204 and locked in place. Thus, for each desired position of the arms 104 or 111, as the case may be, the spring 206 will give a corresponding displacement and transmitted pressure to the front brake.

Referring now to the front wheel brake mechanism, attention is directed to Fig. 3 as illustrative of one method of transmitting the braking effort from the rod 108 up to the two front wheel brakes. This rod, which receives a backward braking pull when braking under either forward or backward motion, has pivotal connection at its front end with the center of an equalizing beam 116. The ends of this equalizing beam have pivotal connection with arms 117 and 118 on sleeves 119 and 121, respectively. These sleeves are pivotally supported upon an axial shaft 122. From the outer end of each sleeve 119 and 121 depends an operating arm 123 having pivotal connection with an operating rod 124 extending to each front wheel. The forward end of each operating rod has pivotal connection through a clevis 125 with the end of a long brake arm 126. A turnbuckle or other form of adjustment 129 may be provided at the juncture of each rod 124 with its clevis 125.

The description of the operation of the braking system will be facilitated by considering the braking system as applied to a car of definite specifications, such as those enumerated in Fig. 1 of the drawings. For convenience of reference, the weight W shall be assumed at 1000 pounds, and the total wheel base L shall be assumed at 120 inches. Furthermore, the center of gravity G shall be assumed as being 30 inches above the ground, and 66 inches or the distance $L_2$ behind the front axle. This leaves the center of gravity 54 inches, or the distance $L_1$ in front of the rear axle. With the car stationary, it will therefore be obvious that the weight $W_1$ applied to the rear wheels is a considerably larger fraction of the total weight W than weight $W_2$ applied to the front wheels.

Assuming now that the car is traveling forward at a moderate rate of speed on a substantially level road and that the brakes are applied to quickly stop the car. In analyzing the variation of forces incident to this change of motion and their relation to the present system of braking, it will first be noted that the inertia of the center of gravity G creates a forward force $f$ parallel with the line of travel of the car. The degree of this force $f$ will, of course, be dependent upon the rate of deceleration of the car. The resultant $r$ of this forward force line $f$ and the weight W shifts the effective point of the center of gravity along the line of the road surface to the point $g'$. This reverses the preponderance of the weight W, it being noted that $l_2$ is shorter than $l_1$, whereby a preponderating portion of the total weight W is now being applied to the front wheels as $W_2$. These front wheels now having the greatest weight effective thereon, therefore having the most effective fraction, are more effective for the application of a braking effort than are the rear wheels. Consequently, at this time, through the instrumentality of the variable ratio leverage mechanism, I transmit a greater braking pressure or a greater retardation per brake to the front wheels than I do to the rear wheels. This follows from the fact that the energy for braking these front wheels is being developed by the propeller shaft brake which is capable of creating a high reactive torque in the brake element 42; and also follows from the proportions of the arm 95, roller 99 and lever 104 (Figs. 6 and 9). With the car rolling forward, the propeller shaft 35 is revolving in a clockwise direction, as viewed from the front of the car. Hence, when the two elements of the propeller shaft brake 39 are forced together, the arm 86 will be swung in a clockwise direction to swing the yoke arm 95 backwardly toward the tubular strut 53 and the other yoke arm 96 forwardly. When the roller 99 first applies pressure to the lever 104, it is applying such pressure to the lever substantially at the point indicated in Fig. 9, or at even a higher point along this lever. As the lever swings upwardly under this pressure, the roller continuously shifts its point of pressure application out along the curved presser foot 103, whereby the effective lever arm through which this pressure is transmitted continuously increases in length. This increase may be a constant or a variable, depending upon the curvature of the foot 103 and upward curvature of the end toe. Thus, as the brake pedal is depressed, the progressive braking retardation effective at the rear wheels operates through the progressive reactionary force transmitted through arm 86 to apply a continuously increasing braking retardation on the front wheels. The spring link 200, as above explained, permits the increase of leverage to occur, as desired, with increased braking effect.

This is illustrated graphically by the curve of Fig. 2. The upper half of the diagram shows the distribution of braking retardation between the front and rear wheels for forward motion, and the lower half of the diagram the distribution for backward motion. The horizontal abscissa axis corresponds to retardation per brake in pounds per thousand pounds total weight of car, and the vertical ordinate axis corresponds to the total retardation in its percentage of total car weight. It will be noted that the line indicating the rear wheel retardation curves upwardly relatively sharply, and soon reaches a point along the horizontal axis beyond which the line does not go and from which it recedes. This corresponds to a substantially locked condition of the rear wheels, with a sliding or skidding contact between the rear wheels and the road surface which in the case of dry, clean, rough cement, gives a coefficient of adhesion of 110%. Up to this point, with the wheels rotating and constantly presenting new friction surfaces to the road, the retardation effective on these rear wheels is continuously increasing. When this skidding or sliding point is reached, however, no further retardation can be gained through these wheels. It will be noted that the retardation per brake for the front wheels runs up to a considerably higher point than for the rear wheels. As before described, this is because in this forward motion the braking impulse shifts the effective location of the center of gravity forwardly so that a much greater weight is effective on the front wheels than on the rear wheels. By virtue of this greater weight upon the front wheels, a greater braking retardation can be applied to these wheels before they will slip or skid. The line or curve $x$ may be retained substantially as a straight line, or may be made to curve either upwardly or downwardly in predetermined relation to the rear wheel curve $y$ by proportioning the lever arms 95 and 104 and by properly shaping the curved presser foot 103. It may be desirable to terminate the front wheel curve $x$ at a lower braking retardation, or to curve this line $x$ to accord with different conditions and requirements existent in different cars, such as different weights, different wheel base lengths, and different locations of the center of gravity relative to the road bed and the spacing between the wheels. Practically all of these requirements or conditions would involve only a relatively slight variation between the two extremes of braking retardation which can be substantially applied to the front wheels, and this relative slight variation can be readily taken care of within the purview of the present invention. As illustrative of one ratio or proportion of braking distribution, the upper half of the diagram in Fig. 2 indicates, for a one hundred per cent retardation corresponding to the total car weight of 1000 pounds, a retardation of approximately 300 pounds for the rear wheels and approximately 700 pounds for the front wheels, the two making up the total retardation of 1000 pounds.

When the car is rolling backward, the conditions are reversed, as it will be obvious that any braking retardation at this time creates an inertia force $f$ in the direction of the rear wheels and shifts the effective point $g'$ of the center of gravity toward the rear wheels, whereby a still greater preponderance of the total car weight is placed on these rear wheels. By virtue of this greater weight now effective on these rear wheels, we can now run the rear wheel curve $y'$ to a considerably higher retardation per brake, as denoted on the lower half of the diagram in Fig. 2. The weight effective on the front wheels is reduced at this time, and, accordingly, the braking retardation which can be developed in the wheels before sliding or skidding is also reduced. This is indicated by the rapid falling off of the curve denoting the front wheel retardation at the bottom of the diagram. This falling off of the braking retardation of the front wheels is accentuated by the action of the presser foot 109 on the end of the yoke arm 96 shifting its point of contact outwardly across the face 111 of the brake operating arm 112. The outward shifting of this point of contact, concurrent with the transmission of operating motion to the front wheel brakes, continuously reduces the mechanical advantage or leverage ratio through which this braking effort is being transmitted, so that the braking retardation on the front wheels at this time falls off substantially as above described and illustrated in Fig. 2. This change in relative position of the pressure foot 109 and lever 111 is also assisted by the play permitted in the spring connection 200, which permits of relative motion of the above-named parts.

Attention is directed to the fact that a unique cooperation exists between the above method of selectively placing the greatest braking retardation or braking effort upon the wheels which have the greatest tractive pressure and the practice of generating the transmitted braking effort at the propeller shaft brake 39, so that this transmitted braking effort will cease when the propeller shaft braking retardation ceases. Through this cooperative relationship, the braking retardation which can be imposed on the front wheels during forward motion of the car can be extended up to a maximum, or to any desired point, without fear of the car tipping forwardly, either on a level surface or when running down hill. This is because the instant the rear wheels tend to raise or actually do leave the road there is no more drag on the propeller shaft brake element 42 and, consequently, no reactive energy is transmitted through the arms 95 and 104 to the front wheel brakes. These brakes, therefore, release instantaneously and eliminate the forward tipping tendency. When rolling backward, either on a level surface or down a relatively steep slope, the presence of the front wheel brakes reduces the braking retardation which must be impressed on the rear wheels to bring the car to a standstill, and thus reduces the tendency to tip backwardly.

I claim:

1. In a vehicle having wheels, with the center of gravity between the wheels and braking means for the wheels, the method of decelerating the vehicle which comprises applying the brakes of the wheels to develop a retarding force on the vehicle, thereby developing a force acting through the center of gravity in the direction of motion of the vehicle equal to and opposite in direction to the retarding force developed by the wheels against the ground, the moment of said reactive force with respect to the supporting surface causing a corresponding distribution of the pressure of the wheels against the supporting surface, and varying the ratio of braking force upon the respective wheels in proportion to their pressures upon the ground.

2. In a vehicle having front and rear wheel brakes, the method of decelerating the vehicle which comprises applying a retarding force to the vehicle and thereby setting up a momentum force in the direction of motion of the vehicle, said momentum force resulting in a variation of the loads on the front and rear wheels, and automatically distributing the braking effort between the front and rear wheels in accordance with this variation of the loads on the wheels.

3. In a vehicle having front and rear wheel brakes, the method of decelerating the vehicle which comprises applying a braking retardation to the vehicle, thereby developing an inertia force acting through the center of gravity in the direction of motion of the vehicle, said inertia force shifting a greater portion of the car weight upon the leading wheels, and automatically increasing the braking effort applied to the leading wheels in accordance with this variation of loads on the wheels.

4. In combination, a vehicle having front and rear wheels, brakes for said wheels, brake actuating mechanism, and brake control mechanism operative to apply the greatest braking pressure to the wheels carrying the greatest load.

5. In combination with a vehicle having front and rear wheels, brakes for said front and rear wheels, and means for transmitting the reactionary effort of braking the rear wheels to the front wheel brakes, said means being operative to cause a greater braking pressure at the front wheels than is effective at the rear wheels.

6. The combination with a vehicle having front and rear wheels, brakes for said front and rear wheels, and means for transmitting the reactionary effort of braking the rear wheels to the front wheel brakes, during forward motion said means being operative to develop a greater braking pressure for the front wheels than is simultaneously existent for the rear wheels.

7. The combination with an automobile having front and rear wheels, rear wheel brake mechanism, front wheel brake mechanism, means for actuating said brakes, and means for transmitting the reactionary effort of braking the rear wheels to said front wheel brake mechanism, said means comprising variable ratio mechanism operative to apply an increasing braking effort to said front wheel brake mechanism with increased braking pressure at said rear wheels.

8. The combination with an automobile having front and rear wheels and a propeller shaft, of a front wheel brake, a brake drum on said propeller shaft, a brake member adapted to engage with said brake drum, a lever pivoted substantially centrally, means for swinging said lever upon rotational movement of said brake member in either direction, and variable ratio mechanism engaging the opposite ends of said lever for transmitting motion therefrom to said front wheel brakes.

9. The combination with an automobile having front and rear wheels and a propeller shaft, of a brake for each front wheel, a braking surface mounted on said propeller shaft, a brake member mounted concentrically of said propeller shaft, pedal operating means for causing said brake member and said braking surface to engage, said brake member having a limited rotational motion in either direction corresponding to forward or backward motion of the vehicle, a yoke having intermediate pivotal support, means for transmitting the rotational motion of said brake member to said yoke, a shaft member, means operatively connecting said shaft member with said front wheel brakes, and a pair of levers extending from said shaft member and adapted to be engaged by the ends of said yoke, said yoke transmitting motion to one of said levers through a shifting point of contact operating to vary the effective length of said lever.

10. In combination, a brake, a driven shaft, a brake element rotatable with the said shaft, a brake member adapted to be moved into engagement with the said element, said brake member being rotatable with the said brake element when in engagement therewith, and a connection between the said brake member and the said brake adapted to utilize the rotation of the said brake member for actuating the said brake, said connection including a yieldable element and a linkage of variable effectiveness for different positions of the parts thereof, said yieldable element permitting change of position of said parts.

11. In combination, a brake comprising a brake drum and a brake shoe, a driven shaft, a brake element rotatable with the said shaft, a brake member adapted to be moved into engagement with the said brake element, said brake member being rotatable with the said brake element when in engagement therewith, and a connection between the said brake member and the said brake shoe adapted to utilize the rotation of the said brake member for moving the said shoe into engagement with the said brake drum, said connection including a linkage of variable effectiveness for different positions of the parts thereof and a yieldable member permitting changes of position in accordance with the degree of application of said brake shoe.

12. In combination in a braking system, a front wheel, a rear wheel, a brake for the front wheel, a brake for the rear wheel, each of said brakes constituting the entire braking means for its wheel and means actuated by the entire reactionary effort of one brake in either forward or rearward direction for actuating the other brake, said latter means being adapted to apply the greatest braking pressure to the front wheel when it carries the greatest load.

13. In combination in a braking system for a vehicle, a guiding wheel, driving wheels, a brake for the guiding wheel, a differential mechanism through which the driving wheels are driven, a brake for said driving wheels acting through the said differential and constituting the entire braking means for said driving wheels, and means for actuating the said guiding wheel brake by the reactionary effort of said driving wheel brake, said means being adapted during forward motion of the vehicle to develop a greater pressure for the front wheel than is simultaneously existent for the rear wheels.

14. In combination in a braking system for a vehicle, a guiding wheel, driving wheels, a differential for actuating said driving wheels, a brake for a guiding wheel, a brake for a driving wheel acting through the said differential, each of said brakes constituting the entire braking means for a wheel, one of said brakes being manually operated, and means for actuating the other brake solely by the reactionary effort of said manually operated brake, said latter means comprising variable ratio mechanism operating to apply an increasing braking effort to said front wheel brake with increased braking pressure at said rear wheels.

In witness whereof, I hereunto subscribe my name this 9th day of May, 1924.

CECIL HAMELIN TAYLOR.